UNITED STATES PATENT OFFICE.

THOMAS INGHAM, OF LIVERPOOL, ENGLAND.

MANUFACTURE OF ALKALINE ALGINATES.

SPECIFICATION forming part of Letters Patent No. 695,209, dated March 11, 1902.

Application filed August 20, 1901. Serial No. 72,702. (No specimens.)

*To all whom it may concern:*

Be it known that I, THOMAS INGHAM, manufacturing chemist, a subject of the King of Great Britain, residing in Liverpool, in the county of Lancaster, England, (whose full postal address is 61 Lord street, Liverpool,) have invented certain new and useful Improvements in the Manufacture of Alkaline Alginates, (for which application has been made in England, under No. 22,590, and dated December 11, 1900,) of which the following is a specification.

This invention has for its object an improvement in the process of making algin or alkaline alginate, for which the late E. C. Stanford obtained British Patent No. 142 of 1881.

In the manufacture of alkaline alginate or algin therefrom it is necessary to form a solution of alkaline alginate containing a very large excess of alkali. From this an impure neutral alkaline alginate or alginic acid mixed with other salt has been obtained by neutralizing the excess of alkali with acetic acid or mineral acid.

Now my invention consists in taking this strongly-alkaline solution of alginate of soda and precipitating therefrom alginic acid by sufficiently strong acid to take up all the alkali. This alginic acid or algin is then, as is well known, easily separated as a precipitate from the solution. I then take a second portion of the strongly-alkaline solution of alginate of soda and add thereto sufficient alginic acid thus precipitated to make the whole a pure solution of alkaline alginate. This solution can now be evaporated down and dried.

Having thus described my invention, the following is what I claim as new therein and desire to secure by Letters Patent:

1. The process of obtaining a pure solution of alkaline alginate which consists in taking the strongly-alkaline solution of alkaline alginate and neutralizing the same by alginic acid.

2. The process of making pure alkaline alginate, which consists in adding to the mixture of alkaline alginate and alkali, alginic acid in the proportions requisite to form pure alkaline alginate and evaporating to dryness.

In witness whereof I have hereunto signed my name, this 10th day of August, 1901, in the presence of two subscribing witnesses.

THOMAS INGHAM.

Witnesses:
 WM. P. THOMPSON,
 SIDNEY W. DOD.